Patented Aug. 2, 1932

1,869,657

UNITED STATES PATENT OFFICE

HAROLD E. BOWERS, OF CHICAGO, ILLINOIS, ASSIGNOR TO THE B. F. GOODRICH COMPANY, OF NEW YORK, N. Y., A CORPORATION OF NEW YORK

RUBBER COMPOSITION AND METHOD OF PRESERVING RUBBER

No Drawing.    Application filed January 16, 1930.    Serial No. 421,262.

This invention relates to the art of preserving rubber, either in a vulcanized or unvulcanized condition, and to rubber compositions so preserved.

It is well known that rubber deteriorates in strength, elasticity and other desirable properties when it is exposed to heat, light or air. Various substances, known to the trade as "age-resisters" or "anti-oxidants", have been added to rubber to retard its deterioration. Among the most successful of these are the aldehyde-amine condensation products, amino-phenols, and secondary aromatic amines.

This invention, in brief, consists in treating rubber with a member of a new class of anti-oxidants which has been found to be particularly effective in retarding the deterioration of rubber. This class comprises nitroso derivatives of secondary amines, and particularly of diaryl substituted amines. For example, this class includes nitroso derivatives of such secondary amines as diethylamine, dibutylamine, dibenzylamine methyl aniline, ethyl aniline, benzyl aniline, di-cyclohexylamine, diphenylamine, di-p-tolylamine, di-o-tolylamine, di-m-tolylamine, phenyl p-toluidine, phenyl o-toluidine, phenyl xylidine, phenyl biphenylamine, di-biphenylamine, phenyl alpha-naphthylamine, phenyl beta-naphthylamine, the tolyl naphthylamines, di-alpha-naphthylamine, di-beta-naphthylamine, alpha-beta-dinaphthylamine, diphenyl ethylene diamine, ditolyl ethylene diamine, dinaphthyl ethylene diamine, diphenyl m-phenylene diamine, diphenyl p-phenylene diamine, dinaphthyl p-phenylene diamine, as well as substituted secondary amines such as dihydroxy diphenylamine, o-chlorphenyl beta-naphthylamine, etc. The nitroso derivatives of cyclic secondary amines such as piperidine and carbazole may likewise be used in certain cases although they are much less active than the nitroso derivatives of the disubstituted amines mentioned above. The methods of preparing nitroso derivatives of the secondary aromatic amines, such as those named above, are well known and need not be described here. Preferably the preparation is so directed that the nitroso group is substituted for the hydrogen of the secondary amino group, forming a so-called nitrosamine, but if desired the nitroso group may be caused to attach itself to the hydrocarbon nucleus, or two or more nitroso groups may be introduced into the molecule, for example one on the amino group and one on the hydrocarbon nucleus.

The nitroso derivatives of the secondary amines are preferably incorporated into rubber before vulcanization, preferably from 0.25 to 5.0 parts by weight to 100 parts of rubber being used. Such treatment imparts excellent age-resisting properties to the rubber, enabling it to withstand aging without sensible deterioration for a much longer period than similar untreated rubber. Certain members of this class of anti-oxidants, especially such as contain one or more nitroso groups attached to the aromatic nucleus, may possess a slight eccelerating power which should be taken into account when the rubber is vulcanized, by reducing either the time or temperature of vulcanization or the proportions of vulcanizing or accelerating agents employed. On the other hand, the nitrosamines, properly so-called, do not accelerate vulcanization. Indeed, certain members of this class, particularly the diaryl nitrosamines, appear to retard vulcanization to some extent, especially at low temperatures. For this reason they are particularly valuable in conjunction with the modern rapid organic accelerators which have a tendency to prevulcanize or "scorch" the rubber during the mixing and masticating operations.

This application is a continuation in part of my co-pending application, Serial No. 341,556, filed February 20, 1929.

*Example 1.*—As a specific example of one embodiment of the method of this invention, a tire tread composition was prepared containing: blended plantation rubbers 100 parts by weight, sulfur 5.5 parts, zinc oxide 30 parts, gas black 40 parts, mineral rubber 10 parts, palm oil 5 parts, and hexamethylene tetramine 0.75 part. This was divided into two portions, one of which was used as a control. To the other was added 0.95 part (0.5% of the composition) of phenyl-alpha-naphtylnitrosamine. The compositions were thoroughly mixed, and vulcanized in a press for 45 minutes at 294° F., to produce the optimum cure. The relative rates of aging of the vulcanized compositions were compared by measuring their respective tensile strengths and elongations before and after aging. Accelerated aging tests were carried out in the Geer aging oven, in which samples were maintained at a temperature of 158° F., in a constantly renewed stream of air, as well as in the Bierer-Davis bomb, in which other samples were maintained at the same temperature (158° F.) in an atmosphere of oxygen at a pressure of 300 lbs. per sq. in. In the table below T indicates ultimate tensile strength in pounds per sq. inch and E indicates ultimate elongation in per cent. of original length.

Aging tests of phenyl-alpha-naphthyl-nitrosamine

|  | Without anti-oxidant | | With anti-oxidant | |
| --- | --- | --- | --- | --- |
|  | T | E | T | E |
| Original | 3731 | 697 | 3872 | 693 |
| After 7 days in Geer oven | 2186 | 560 | 2978 | 587 |
| After 48 hrs. in Bierer-Davis bomb | 1038 | 417 | 2713 | 600 |

*Example 2.*—As another example, two compositions were prepared, vulcanized and tested as in Example 1 above, except that phenyl-beta-naphthyl-nitrosamine was employed as anti-oxidant. The aging results are tabulated below.

Aging tests of phenyl-beta-naphthyl-nitrosamine

|  | Without anti-oxidant | | With anti-oxidant | |
| --- | --- | --- | --- | --- |
|  | T | E | T | E |
| Original | 3410 | 630 | 3620 | 663 |
| After 9 days in Geer oven | 1910 | 457 | 2700 | 597 |
| After 48 hrs. in Bierer-Davis bomb | 800 | 297 | 2710 | 580 |

*Example 3.*—Nitroso derivatives of disecondary amines are also extremely active antioxidants. For example, the nitroso derivative of diphenyl-p-phenylene-diamine, prepared by reacting nitrous acid with symmetrical diphenyl-p-phenylene-diamine, gave the following aging results when tested in rubber as described in Example 1 above:

Aging tests of diphenyl-p-phenylene-dinitrosamine

|  | Without anti-oxidant | | With anti-oxidant | |
| --- | --- | --- | --- | --- |
|  | T | E | T | E |
| Original | 3410 | 630 | 3490 | 643 |
| After 9 days in Geer oven | 1910 | 457 | 3100 | 590 |
| After 48 hrs. in Bierer-Davis bomb | 800 | 297 | 2800 | 600 |

*Example 4.*—In the following table are shown the results of tests of the anti-oxidant power of nitroso derivatives of other representative secondary amines. The rubber composition was the same described in Example 1 above, 0.5% of the anti-oxidant being used.

Aging tests of nitroso derivatives of secondary amines

| Anti-oxidant (0.5%) | Before aging | | After 7 days in the Geer oven | | After 48 hrs. in Bierer-Davis bomb | |
| --- | --- | --- | --- | --- | --- | --- |
|  | T | E | T | E | T | E |
| None (control) | 3616 | 648 | 1625 | 465 | 904 | 352 |
| p-nitroso diphenylamine | 3371 | 563 | 2725 | 420 | 2515 | 465 |
| Diphenyl nitrosamine | 3975 | 677 | 1741 | 477 | 2838 | 630 |
| P-p'-dihydroxy diphenyl nitrosamine | 3360 | 673 | 2060 | 543 | 2260 | 535 |
| Di-p-tolyl nitrosamine | 3750 | 667 | 2950 | 543 | 2730 | 545 |
| o-chlorphenyl beta-naphthyl nitrosamine | 3540 | 687 | 1940 | 530 | 1610 | 495 |
| Beta - dinaphthyl nitrosamine | 3610 | 647 | 2240 | 490 | 2330 | 500 |
| Diphenyl ethylene dinitrosamine | 3480 | 657 | 2100* | 527* | 1900 | 557 |
| Di-p-tolyl ethylene dinitrosamine | 3350 | 637 | 2360* | 577* | 1940 | 557 |
| Benzyl phenyl nitrosamine | 3732 | 613 | 1920 | 456 | --- | --- |
| Ethyl phenyl nitrosamine | 3852 | 677 | 1931 | 518 | 1557 | 497 |

* These values obtained after 9 days in the Geer oven.

It is to be understood that the examples are merely illustrative, and that the nitroso derivatives of secondary amines may be incorporated into vulcanizable rubber compositions of the most various nature with good effect upon the age-resisting properties of the vulcanized rubber derived therefrom.

It is to be understood that the term "rubber" is employed in the claims in a generic sense to include caoutchouc, whether natural or synthetic, reclaimed rubber, balata, gutta percha, rubber isomers and like products, whether or not admixed with fillers, pigments, softeners, etc.

While I have herein disclosed certain preferred manners of performing my invention, I do not thereby desire or intend to limit myself solely thereto, for, as hitherto stated, the precise proportions of the materials utilized may be varied and other materials having equivalent chemical properties may be employed if desired without departing from the spirit and scope of the invention as defined in the appended claims.

I claim:

1. The method of preserving vulcanized rubber which comprises treating the rubber before vulcanization with an alkyl substituted diaryl nitrosamine.

2. The method of preserving vulcanized rubber which comprises treating the rubber before vulcanization with di-p-tolyl nitrosamine.

3. A vulcanized rubber composition comprising an alkyl substituted diaryl nitrosamine.

4. A vulcanized rubber composition comprising di-p-tolyl nitrosamine.

5. A vulcanized rubber product resulting from the vulcanization of a composition comprising rubber, sulphur, an accelerator of vulcanization and a substituted diphenyl nitrosamine.

6. A rubber product which has been vulcanized in the presence of an alkyl substituted diaryl nitrosamine.

7. A rubber product which has been vulcanized in the presence of a ditolyl nitrosamine.

8. The method of preserving rubber which comprises treating rubber with a nitroso derivative of a hydrocarbon substituted diaryl nitrosamine.

9. The method of preserving rubber which comprises treating rubber with a nitroso derivative of an alkyl substituted diarylamine.

10. The method of preserving rubber which comprises treating rubber with a diaryl nitrosamine in which a hydrocarbon group is substituted on at least one of the aryl groups.

11. The method of preserving rubber which comprises treating rubber with a hydrocarbon substituted diphenyl nitrosamine.

12. The method of preserving rubber which comprises treating rubber with a diaryl nitrosamine in which at least one of the aryl groups consists of two aromatic rings directly connected through a single valence bond.

13. The method of preserving rubber which comprises treating rubber with phenyl biphenyl nitrosamine.

14. The method of preserving rubber which comprises treating rubber with tolyl naphthyl nitrosamine.

15. A rubber composition comprising rubber and a nitroso derivative of a hydrocarbon substituted diaryl nitrosamine.

16. A rubber composition comprising rubber and a nitroso derivative of an alkyl substituted diarylamine.

17. A rubber composition comprising rubber and a diaryl nitrosamine in which a hydrocarbon group is substituted on at least one of the aryl groups.

18. A rubber composition comprising rubber and a hydrocarbon substituted diphenyl nitrosamine.

19. A rubber composition comprising rubber and a diaryl nitrosamine in which at least one of the aryl groups consists of two aromatic rings directly connected through a single valence bond.

20. A rubber composition comprising rubber and phenyl biphenyl nitrosamine.

21. A rubber composition comprising rubber and tolyl naphthyl nitrosamine.

In witness whereof I have hereunto set my hand this 11th day of January, 1930.

HAROLD E. BOWERS.